United States Patent [19]

Okazaki

[11] Patent Number: 4,676,882
[45] Date of Patent: Jun. 30, 1987

[54] ELECTROLYSIS UNIT WITH MEMBRANE SUPPORT MEANS

[76] Inventor: Tatsuo Okazaki, 7-18, Nishi 2-chome, Kamifukuoka-shi; Saitama-ken, Japan

[21] Appl. No.: 779,801

[22] Filed: Sep. 24, 1985

[51] Int. Cl.$^4$ .................. C25B 9/00; C25B 13/02; C25B 11/02
[52] U.S. Cl. .................. 204/260; 204/282; 204/283; 204/286; 204/263
[58] Field of Search .................. 204/260, 282–283, 204/286, 263

[56] References Cited

U.S. PATENT DOCUMENTS

| | | | |
|---|---|---|---|
| 3,236,692 | 2/1966 | Lewis | 204/260 |
| 3,891,532 | 6/1975 | Jensen et al. | 204/260 |
| 3,933,614 | 1/1976 | Bunn et al. | 204/260 X |
| 3,984,303 | 10/1976 | Peters et al. | 204/260 |
| 4,169,035 | 9/1979 | Stummer et al. | 204/260 |
| 4,533,451 | 8/1985 | Kumazawa | 204/260 X |

Primary Examiner—Donald R. Valentine
Attorney, Agent, or Firm—Frishauf, Holtz, Goodman & Woodward

[57] ABSTRACT

An electrolysis unit for improving water quality in continuous production comprises a pair of electrodes formed into cylinders and an ion-exchanging membrane disposed between the cylinders so as to form two separate water paths having circular forms with thin widths. The membrane is characterized by special supporting structure therefor to maintain its shape.

2 Claims, 5 Drawing Figures

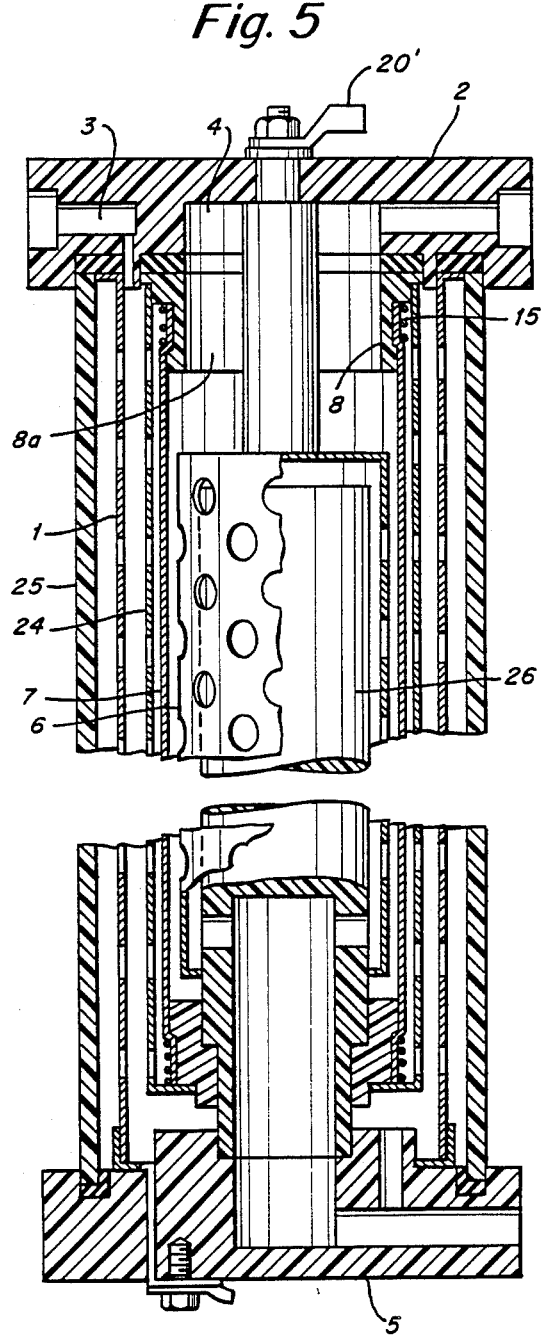

ELECTROLYSIS UNIT WITH MEMBRANE SUPPORT MEANS

BACKGROUND OF THE INVENTION

The present invention relates to an electrolysis unit for improving water quality in continuous production.

In the prior art, a water-electrolyzing device for continuous operation had a problem that drinking water is supplied directly and touchably to the user's hands under a condition wherein direct current is charged to the water body for water-electrolysis. In order to avoid an electric shock as far as possible to the user, a low level voltage should be used in the water electrolyzing device. Considering the electrical resistance of natural water, sufficient ionization of water using a low voltage is caused with a higher direct current density through the water body and the keeping of the water in the electrolysis area. Therefore, the distance between positive and negative electrodes biased by direct current should be as short as possible. The cross-sectional areas of water paths, which are formed among the electrodes and an unglazed partition disposed between the electrodes, should be kept as large as possible. Nevertheless, the unglazed partition has a thickness almost taking possession of a suitable distance between the electrodes needed to provide the low voltage.

In order to obtain the short distance between the electrodes, the present inventor already proposed use of an ion-exchanging membrane instead of the unglazed partition. However, a new problem in the design of the water-electrolysis device is generated when using the membrane. The new problem is caused by the membrane's qualities whereby it is not self-keeping in steady form, and it does not have sufficient solidity to permit an easy and safe part-exchange.

An object of this invention is to provide a specific construction so improved as to keep an ion-exchanging membrane in steady form and to enable it to be exchanged in safety.

Other objects of this invention will be apparent from the following description with reference to appended drawings.

SUMMARY OF THE INVENTION

In accordance with the invention, an electrolysis unit for improving water quality during continuous production of electrolyzed water, comprises a pair of cylindrical electrodes arranged concentrically in an electrolysis chamber, an ion-exchanging membrane disposed between the cylinders so as to form two separate water paths on opposite sides of the ion-exchanging membrane, the water paths having widths and circular forms, and a supporting means for supporting the ion-exchanging membrane at both ends so as to retain same in a generally cylindrical form. Preferably, the ion-exchanging membrane is removably disposed between the cylindrical electrodes.

BRIEF DESCRIPTION OF THE DRAWINGS

FIG. 5 is a vertical cross-sectional view of a unit further modified from that of FIG. 4.

DETAILED DESCRIPTION

Figure 1:
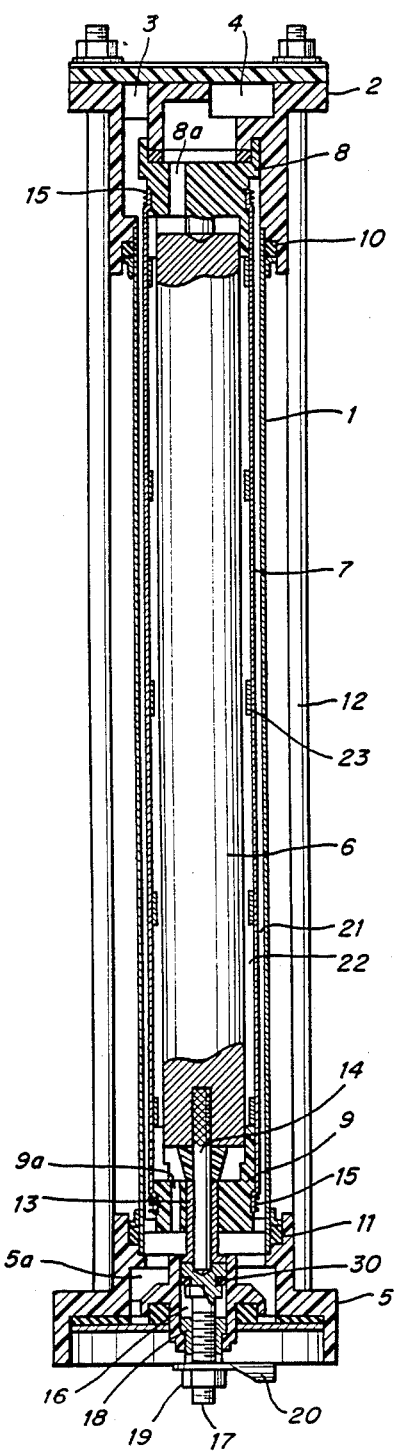
FIG. 1 is a vertical cross-sectional view of an electrolysis unit embodying this invention.
Figure 2:
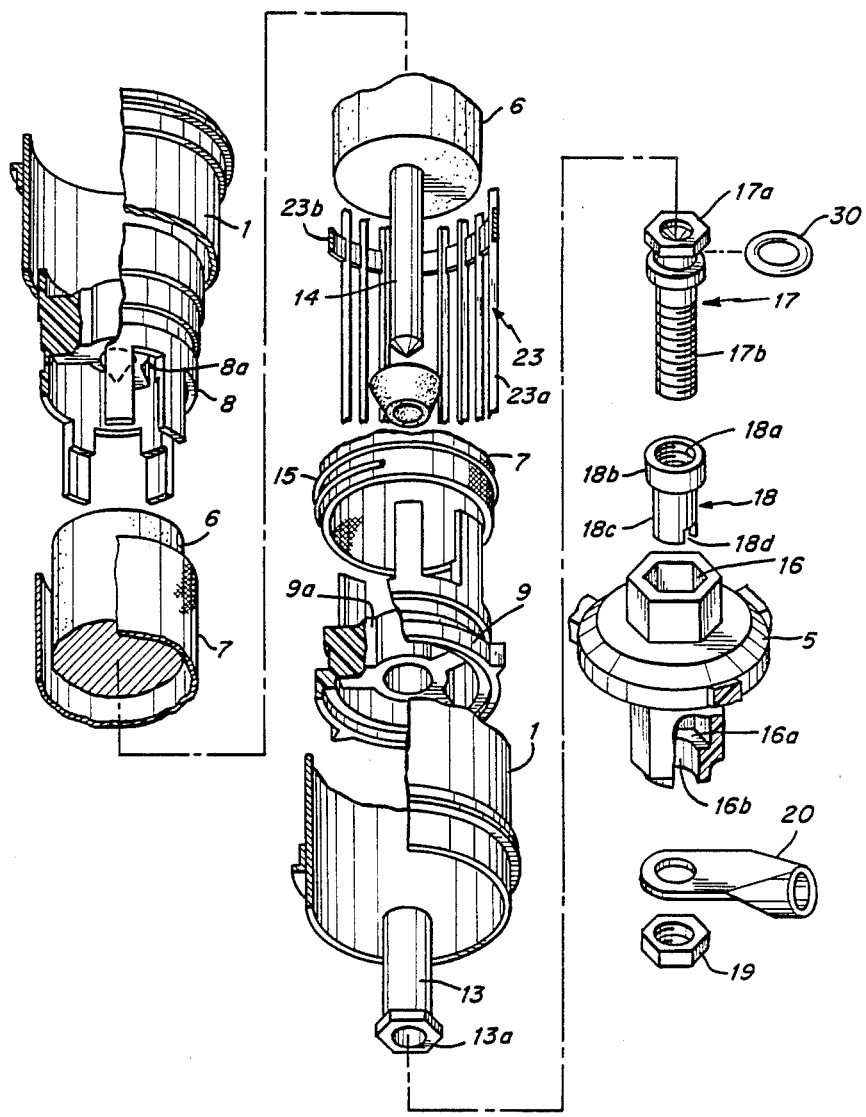
FIG. 2 is a perspective view of the unit in FIG. 1 wherein the essential parts are dismounted.

Referring to FIGS. 1 and 2, an electrolysis unit includes a cylindrical negative electrode 1 serving as an outer shell forming an electrolysis chamber, said electrode 1 being made from an electrical conductor such as stainless steel, a top end block 2 (not shown in FIG. 2) having two outlet ports 3 and 4, a bottom end block 5 having an inlet port 5a, said blocks 2 and 5 being attached to the ends of the outer shell 1, a cylindrical positive electrode 6 disposed within the center of the outer shell 1, said electrode 6 being made from an electrical conductor such as ferrite, an ion-exchanging membrane 7 formed to or wound in a cylindrical shape, two supporting members 8 and 9 disposed at the upper and lower end portions of the electrolysis unit and being arranged interior of the outer shell 1, and means for fixing the opposite ends of the ion-exchanging membrane 7 to the respective supporting members 8 and 9.

In the embodiment, the outer shell 1 may have its outer surface coated with synthetic resin such as Teflon.

The ion-exchanging membrane 7, under the direct current flowing between the positive and negative electrodes, passes anions from the negative electrode to the positive electrode therethrough.

In a reverse case, the membrane 7 is so used as to pass cations from the positive electrode to the negative electrode therethrough when the polarity of the system is reversed.

The outer shell 1 and blocks 2 and 5 are assembled as one unit with opposite ends of the outer shell 1 being inserted in circular grooves 10 and 11 formed in the blocks 2 and 5, respectively, in a manner to be kept in water tightness by means of gaskets (elastic members or "O" rings) disposed in the interiors of the grooves 10 and 11. Stud bolts 12 (with nuts at the ends) connect the blocks 2 and 5 together as seen in FIG. 1. A plurality of the bolts 12 (with nuts at the ends) connect the blocks 2 and 5 together as seen in FIG. 1. A plurality of the bolts 12 is provided around the periphery of the unit.

In this embodiment, the supporting member 8 is fixedly attached to the upper portion of the positive electrode 6 and, the supporting member 9 is supported on a slider member 13 attached to an electrically conductive rod 14 fixed to the bottom end of the positive electrode 6. The rod 14 is shown embedded in the lower end of positive electrode 6.

The fixing means for membrane 7 may be strong and slender strings 15 such as silkworm gut and used in a manner to fix both opposite ends of the membrane 7 to the peripheries of the respective supporting members 8 and 9 with their strings 15 being tightly wound therearound. The slider member 13 may have a hexagonal head 13a (see FIG. 2) slidably inserted into a guide through hole 16 having a hexagonal cross-section in the same size as that of the head 13a and formed in the block 5. The slider 13 is shifted up or down by means of a screw member 17 made from an electrical conductor such as stainless steel and having a hexagonal head 17a and a screw portion 17b on the outer periphery of the body thereof, said head 17a being slidably inserted into the guide through hole 16 and said screw 17b projecting downwards from the hole 16. The block 5 has a stepped portion 16a (see FIG. 2) and a circular bore 16b formed at the bottom of the through hole 16. Stepped portion 16a has a diameter smaller than that of the through hole 16.

There is further provided an adjusting nut 18 which has an inner screw thread 18a adjustably intermeshed with the screw 17b of the screw member 17, a rounded head 18b turnable in the interior of the through hole 16 and stopped by means of the stepped portion 16a, a rounded body 18c turnable in the interior of the circular bore 16b, and a screw slot 18d adapted to receive a screwdriver.

The adjusting nut 18 is rotatably screwed to the screw member 17 so as to push the head 13a of slider member 13 upwards. A nut 19 is screwed onto the screw member 17 so as to fix an electrical terminal member 20 thereto. In the hole 16 is located an O-ring 30 for water sealing between the head 17 and hole 16.

By such construction, the interior of the electrolysis chamber is separated into two water paths 21 and 22, path 21 being formed between the inner periphery of the negative electrode 1 and the outer periphery of the ion-exchanging membrane 7, and path 22 being formed between the outer periphery of the positive electrode 6 and the inner periphery of the ion-exchanging membrane 7. The water path 21 communicates with the inlet port 5a and outlet port 3, and the water path 22 communicates with the inlet port 5a via a path 9a formed in the supporting member 9 and with the outlet port 4 via a path 8a formed in the supporting member 8.

In this case, the membrane 7 is kept in its cylindrical form due to the fact that both opposite ends thereof are fixed to the round surfaced supporting members 8 and 9.

The water paths 21 and 22 should be designed with their circular cross-sections each having thin widths, for instance, 0.5-1 mm. Also, the electrolysis partition is extremely thin due to the use of the membrane 7 so that the distance between the electrodes 1 and 6 is very short. This enables a high direct current density to be kept in the water body under a low level voltage, thereby providing safety.

Furthermore, the circular length of the water paths 21 and 22 are all included in the electrolysis area. As a result, the water electrolysis unit of this invention accomplishes a sufficient water-ionization, even using a lower voltage. The membrane 7, since it is assembled to the supporting members 8 and 9 as a unit, can be safely removed from the shell 1 of the electrolysis chamber under its steady cylindrical form.

In the above described embodiment, the unit includes the positive electrode 6, and the membrane 7 could be removed together with the electrode 6.

In order to prevent the membrane 7 from drooping inwards when the water pressure in the path 22 is lower than that in the path 21 (in the reverse case, the membrane is kept in itself in spite of expansion force applied to its cylindrical form), this embodiment further includes (see FIG. 2) a latticed cylindrical supporter 23 comprising a plurality of longitudinal bars 23a and a plurality of cross-plates or bars 23b integrally connected to the longitudinal bars 23a in a manner to be spaced from each other and to be circular. The lattice 23 is located between the positive electrode 6 and the membrane 7 so as to maintain the water passage in the path 22 in spite of the tendency of drooping of the membrane 7. The supporter 23 may be made from a steel net or the like.

Figure 3:
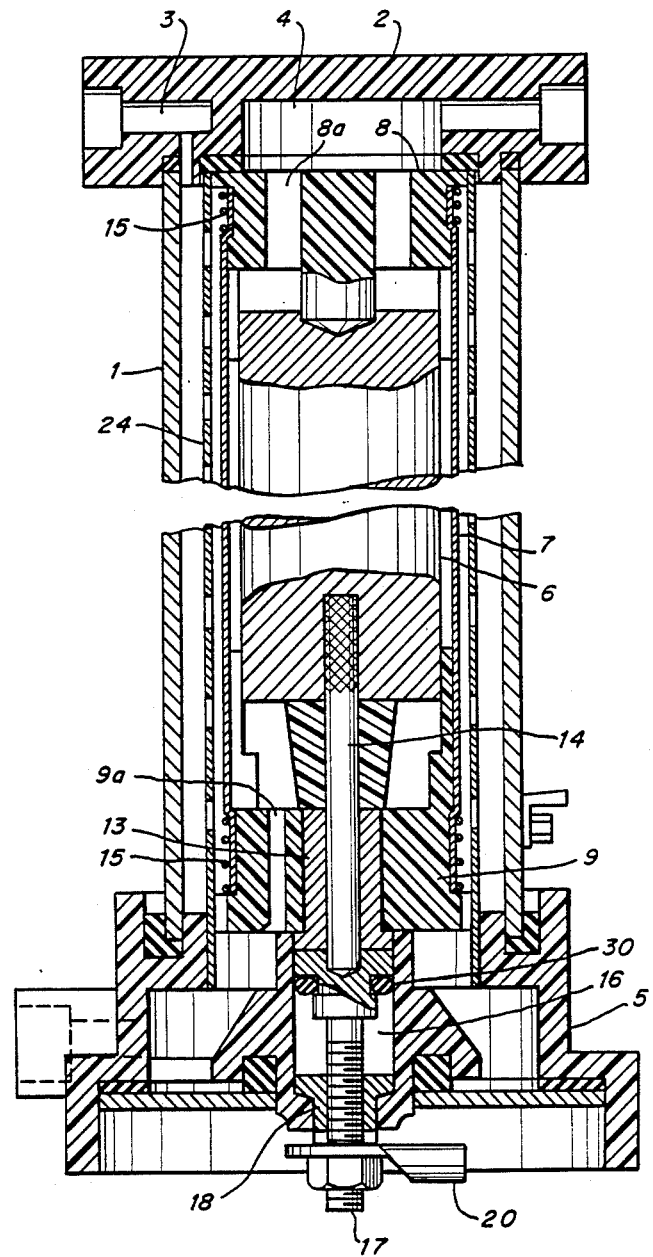
FIG. 3 is a vertical cross-sectional view of another embodiment.

FIG. 3 shows another embodiment, wherein the supporting members 8 and 9 are connected to the opposite ends of a cylindrical supporting member 24, which may be made from punched metal to provide a perforated metal support member 24. Supporting member 24 is preferably separated from the positive electrode 6 and is united only to the supporting members 8 and 9. In this embodiment, the supporting member 24 is positioned at the outside of the membrane 7 so as to protect the membrane 7 from accidental forces or trauma when the unit is removed from the shell 1.

Figure 4:
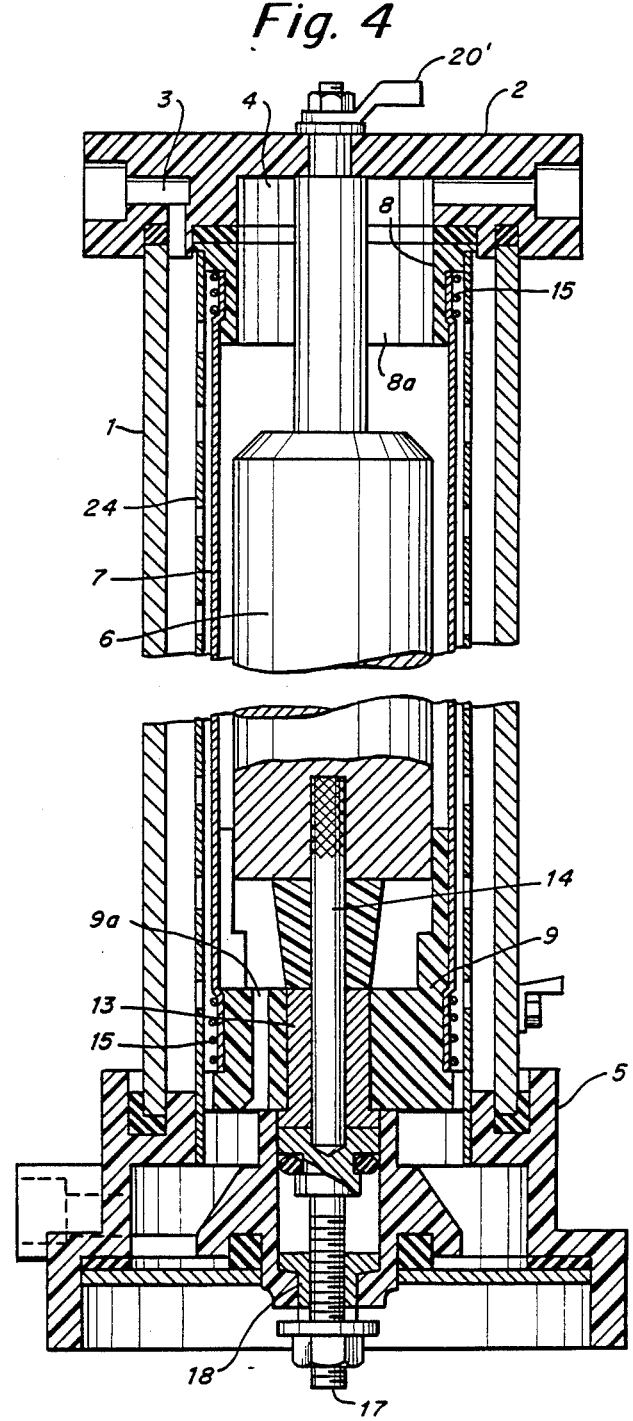
FIG. 4 is a vertical cross-sectional view of a unit modified from that of FIG. 3.

FIG. 4 shows a modification of the embodiment of FIG. 3, wherein the supporting members 8 and 9 are detachably connected directly to the blocks 2 and 5, respectively.

FIG. 5 shows a further modification of the embodiment of FIG. 3, wherein the negative electrode 1 is independent of an outer shell 25 for an electrolysis chamber, and the positive electrode 6 is also separated from an inner shell 26 for an electrolysis chamber. The inner shell 26 may be formed as a column. In this case, the negative electrode 1 and shell 25 may be disposed as close to each other as possible, and the positive electrode 6 and shell 26 may be disposed as close to each other as possible. Both electrodes 1 and 6 may be made from punched metal or the like. Shells 25 and 26 are preferably made of plastic resinous material, such as polyamides.

The terminals 20' in FIGS. 4 and 5 are equivalent to the terminal 20 in FIGS. 1 and 2.

The above embodiments may be modified so that the electrode 1 positioned to outside of the electrolysis chamber may be used as a positive electrode and so that the electrode 6 positioned to inside of the electrolysis chamber may be used as a negative electrode. This involves reversing the polarity of the system.

In operation, the water-ionization is accomplished with the water continuously passing through water paths 21 and 22 from the inlet port 5a to the outlet ports 3 and 4 under such condition that the direct current produced by a low voltage impressed across the electrodes 1 and 6, causes the water body in the paths 21, 22 to be sufficiently electrolyzed through the ion-change membrane 7, so as to obtain two ionized water bodies having rich cation or anion contents respectively.

I claim:

1. A continuous production type electrolysis unit for improving water quality, comprising:
   an electrolysis chamber;
   a pair of substantially cylindrical electrodes positioned concentrically in said electrolysis chamber with one forming an inner cylindrical wall and the other forming an outer cylindrical wall;
   a substantially cylindrical ion-exchanging membrane disposed between and spaced from said cylindrical electrodes so as to form two separate substantially circular water paths with one being radially outside said membrane and the other being radially inside said membrane, said paths having thin widths;
   a pair of supporting members removably fixed, respectively, to the ends of said electrode forming the inner cylindrical wall and means fixing the ends, respectively, of said membrane to said pair of supporting members for supporting said substantially cylindrical membrane at least at both ends thereof so as to maintain said membrane in said substantially cylindrical form, one of said pair of supporting members including a passage communicating the inside water path with a water inlet port; and said electrode forming the inner cylindrical wall, said pair of supporting members, said membrane, and said fixing means forming an assembly unitarily removable from and insertable into the electrode forming the outer cylindrical wall.

2. The electrolysis unit of claim 1, further including supporting means including a substantially cylindrical supporter located between the cylindrical electrode and said membrane to prevent said membrane from drooping inwards when the inside water path has a pressure lower than that of the outside water path.

* * * * *